United States Patent
Markert

(10) Patent No.: US 11,407,261 B2
(45) Date of Patent: Aug. 9, 2022

(54) FASTENING APPARATUS FOR FASTENING A MEASURING SENSOR, IN PARTICULAR A TIRE PRESSURE SENSOR

(71) Applicant: ALLIGATOR VENTILFABRIK GMBH, Giengen (DE)

(72) Inventor: Christian Markert, Herbrechtingen (DE)

(73) Assignee: TIRECHECK GMBH, Heidenheim (DE)

( * ) Notice: Subject to any disclaimer, the term of this patent is extended or adjusted under 35 U.S.C. 154(b) by 272 days.

(21) Appl. No.: 15/663,293

(22) Filed: Jul. 28, 2017

(65) Prior Publication Data
US 2018/0029428 A1 Feb. 1, 2018

(30) Foreign Application Priority Data
Jul. 29, 2016 (DE) .......................... 102016214089.2

(51) Int. Cl.
*B60C 23/04* (2006.01)
(52) U.S. Cl.
CPC .............................. *B60C 23/04985* (2020.05)
(58) Field of Classification Search
None
See application file for complete search history.

(56) References Cited

U.S. PATENT DOCUMENTS

| | | | |
|---|---|---|---|
| 2,723,700 A * | 11/1955 | Caldwell | B60C 23/0403 152/418 |
| 4,235,184 A * | 11/1980 | Schiavone | B60C 23/0408 116/34 R |
| 4,507,956 A | 4/1985 | Schlesinger et al. | |
| 5,295,490 A * | 3/1994 | Dodakian | A61B 5/1135 600/534 |
| 5,541,574 A | 7/1996 | Lowe et al. | |
| 5,844,131 A | 12/1998 | Gabelsmann et al. | |
| 6,171,258 B1 * | 1/2001 | Karakasoglu | A61B 5/0205 600/529 |
| 6,175,301 B1 * | 1/2001 | Piesinger | B60C 23/0433 116/34 R |

(Continued)

FOREIGN PATENT DOCUMENTS

| | | |
|---|---|---|
| DE | 195 29 289 | 2/1997 |
| DE | 100 07 375 | 1/2002 |

(Continued)

OTHER PUBLICATIONS

Office Action dated Feb. 9, 2017 in corresponding German Application No. 10 2016 214 089.2.

*Primary Examiner* — Jill E Culler
(74) *Attorney, Agent, or Firm* — Faegre Drinker Biddle & Reath LLP

(57) ABSTRACT

The invention relates to a fastening apparatus for fastening a measuring sensor, such as a tire pressure sensor, within a tire cavity on a vehicle rim,
  having a band-shaped tensioning belt which has a receiving device for the measuring sensor; wherein
  the band-shaped tensioning belt comprises an elastic material.
The fastening apparatus according to the invention is characterized in that the band-shaped tensioning belt is provided in the form of a continuous endless belt, which is closed on its circumference and is only elastic in sections.

24 Claims, 2 Drawing Sheets

(56) References Cited

U.S. PATENT DOCUMENTS

| | | | |
|---|---|---|---|
| 6,546,982 B1* | 4/2003 | Brown | B60C 23/04 |
| | | | 152/152.1 |
| 7,034,672 B2* | 4/2006 | Dinello | B29C 41/18 |
| | | | 340/442 |
| 7,104,298 B2* | 9/2006 | Starinshak | H01Q 1/2241 |
| | | | 152/152.1 |
| 7,271,709 B2 | 9/2007 | Miller et al. | |
| 2001/0015249 A1 | 8/2001 | Mohr | |
| 2004/0016488 A1* | 1/2004 | Benedict | B60C 23/0433 |
| | | | 152/152.1 |
| 2004/0155764 A1 | 8/2004 | Ichinose | |
| 2005/0242937 A1 | 11/2005 | Yokoi et al. | |
| 2005/0283082 A1* | 12/2005 | Geddes | A61B 5/0059 |
| | | | 600/485 |
| 2009/0139063 A1* | 6/2009 | Shimura | B60C 23/0408 |
| | | | 24/274 R |
| 2011/0296907 A1* | 12/2011 | Luce | B60C 23/0498 |
| | | | 73/146.8 |
| 2016/0129738 A1* | 5/2016 | Luce | B60C 23/20 |
| | | | 73/756 |
| 2016/0229238 A1 | 8/2016 | Schwammlein et al. | |

FOREIGN PATENT DOCUMENTS

| | | |
|---|---|---|
| DE | 10 2006 038 059 | 6/2007 |
| DE | 10 2008 060 542 | 6/2010 |
| DE | 10 2010 037 597 | 3/2012 |
| DE | 20 2012 103 179 | 10/2012 |
| DE | 10 2013 221 225 | 4/2015 |
| EP | 0 751 017 | 1/1997 |
| GB | 2 016 383 | 9/1979 |

\* cited by examiner

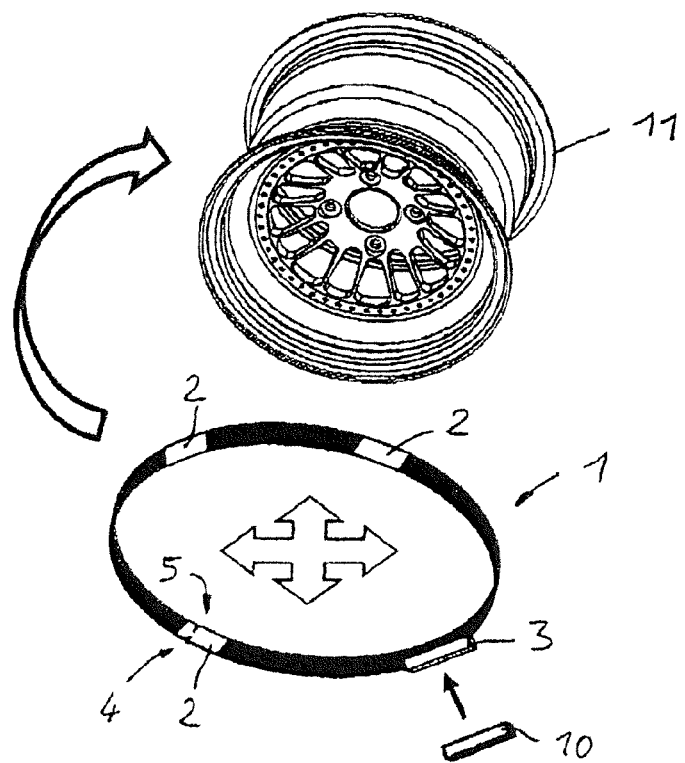
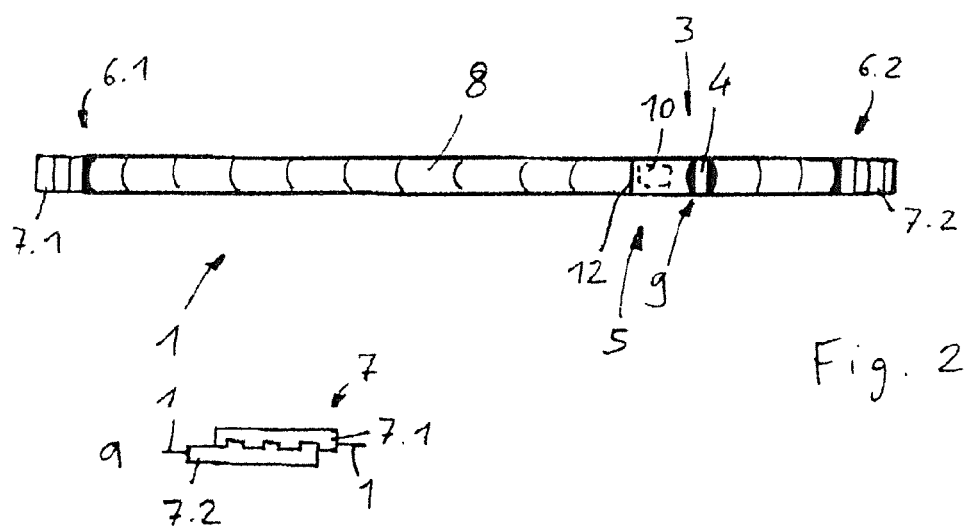
Fig. 1
Fig. 2

FASTENING APPARATUS FOR FASTENING A MEASURING SENSOR, IN PARTICULAR A TIRE PRESSURE SENSOR

The present invention relates to a fastening apparatus for fastening a measuring sensor, in particular a tire pressure sensor, within a tire cavity according to the preamble of the independent patent claims.

Tire pressure sensors are mounted within the tire cavity on the tire or on a vehicle rim in order to detect the air pressure in the tire or tire cavity continuously or at intervals during operation of the vehicle. The air pressure detected by the tire pressure sensor is transmitted to a receiver in the vehicle by means of a transmitting device integrated in the tire pressure sensor and evaluated, so that a warning message can be output in the case of an impermissible pressure drop.

Conventionally, a corresponding tire pressure sensor is fastened to the rim either by a mechanical, advantageously articulated, connection of the tire pressure sensor at the inner end of the tire valve. It is disadvantageous that special constructions of the valves are necessary for this purpose and, owing to the positioning outside the so-called deep-bed of the rim, there is a likelihood that the tire pressure sensor is damaged when the tire is removed from or pulled onto the rim. An example of such a tire pressure sensor attached to the tire valve is disclosed in EP 0 751 017 A2.

DE 10 2006 038 059 A9 describes the attachment of a tire pressure sensor to a motor vehicle rim by means of an adhesive strip. For this purpose, a base is glued from the outside in the deep-bed of the rim by means of the adhesive strip. The tire pressure sensor can then be attached to the base. For securing purposes, a lashing strap can be passed over the rim through the base, which is closed with a belt buckle, which can be designed as a disposable or reusable article, over the circumference of the rim. As a belt buckle, for example, a crimp lock or a countersunk lock or also a worm gear lock can be considered. The adhesive strip is generally a double-sided adhesive tape. Thus, the primary attachment of the tire pressure sensor is performed by the adhesive tape, which reliably prevents the tire pressure sensor from shifting on the rim. Strong centrifugal forces which could detach the base from the adhesive tape or the adhesive tape from the rim are compensated by the belt.

An approach that deviates therefrom is described in DE 10 2010 037 597 A1. According to the fastening apparatus shown there for fastening a tire module, in particular an air pressure sensor, for tires, it is to be avoided that the tire module rests against the vehicle rim. Rather, the tire module is intended to position freely inside the tire cavity in order to improve the quality of the measured temperature of the air in the tire cavity, in that the measured temperature is not influenced by the temperature of the vehicle rim. The module is to be decoupled thermally from both the tire and the vehicle rim. For this purpose, starting from approaches in which the tire module is arranged without attachment in the tire cavity, it is proposed to arrange the tire module in a freely movable manner on a band-like holding means, wherein the band-like holding means is arranged substantially coaxially on the vehicle rim in the tire cavity, as a result of which the tire module, during rotation of the vehicle tire, is spaced from the tire inner side and from the outer circumferential side of the vehicle rim. Accordingly, the tire module is neither attached to the rim nor to the inside of the tire, e.g. by means of a corresponding adhesive process. The band-like holding means is loosely looped around the vehicle rim and loosely attached thereto. In order to achieve an abrasion-resistant, high-strength, temperature-resistant and air-permeable holding means, this can consist of a synthetic fiber material. The mutually opposite ends of the band-like holding means can be connected by a Velcro fastener during assembly on the vehicle rim, and the tire module can be arranged in a closable pocket on the band-like holding means.

The present invention relates exclusively to a fastening apparatus for fastening a measuring pressure sensor within a tire cavity to a vehicle rim, in which the measuring pressure sensor, in particular the tire pressure gauge, is firmly clamped on the surface of the vehicle rim because in the case of an optionally provided temperature measurement it is intended to also consider the rim temperature in particular. Compared with the state of the art with crimp, countersunk or worm gear belt locks and with belt straps, which are usually made of metal, wherein the tire pressure sensor is fixed primarily by gluing to the rim, mounting should occur in a faster and more comfortable manner and gently with respect to the rims, and especially large diameter ranges should be covered by a single fastening apparatus. At the same time, the disadvantages mentioned at the outset, which prevail in the case of attachments of tire pressure sensors on valves, are to be avoided.

US 2005/0242937 A1 discloses a rubber band or rubber ring which is attached to the rim to hold a tire pressure transducer. The tire pressure transducer (transmitter) can be attached by scorching or mounted in a provided base. US 2005/0242937 A1 further discloses a hose filled with pressurized gas for fastening the transmitter, wherein the hose rests against the tire on the inside and thus carries the transmitter at a distance from the tire.

DE 195 429 289 A1 discloses a stretchable textile for fastening a tire pressure transducer to a vehicle rim.

The above-mentioned embodiments have the disadvantage that in practical use they cannot reliably ensure the necessary bracing or sufficient clamping force in any operating condition and at any temperature. Furthermore, the production is still comparatively costly.

Reference is made below to the further prior art:
US 2004/0155764 A1
DE 10 2008 060 542 B3
U.S. Pat. No. 5,541,574A
U.S. Pat. No. 4,507,956A
GB 2 016 383 A
DE 20 2012 103 179 U1
DE 100 07 375 C2
DE 10 2013 221 225 A1

In this case, US 2004/0155764 A1 discloses a rubber band for fastening a tire pressure sensor. DE 10 2008 060 542 B3 discloses a tensioning belt of spring steel, which has individual radially outwardly bent sections, in order to introduce zones of lower elasticity for the compensation of tolerances. A base is attached to the spring steel, which can accommodate a sensor.

It is therefore the object of the present invention to provide a fastening apparatus for fastening a measuring sensor, in particular a tire pressure sensor, within a tire cavity on a vehicle rim, which can be used universally on rims of different rim diameters and designs, and can be used comfortably both during initial installation by vehicle manufacturers and during retrofitting in workshops.

The object according to the invention is achieved by a fastening apparatus having the features of the independent patent claims. Advantageous and particularly expedient embodiments of the invention are presented in the dependent claims.

According to a first embodiment of the invention, a fastening apparatus according to the invention for fastening a measuring sensor, such as a tire pressure sensor, has a band-shaped tensioning belt within a tire cavity on a vehicle rim, which comprises a receiving device for the measuring sensor. The band-shaped tensioning belt comprises an elastic material.

The band-shaped tensioning belt is provided in the form of a continuous endless band, which is closed on its circumference and is only elastic in sections. This means that only individual circumferential sections of the band-shaped tensioning belt are elastic, whereas between the elastic circumferential sections non-elastic circumferential sections of the tensioning belt are provided. At least one elastic circumferential section of the tensioning belt is provided, as well as an adjoining non-elastic circumferential section of the tensioning belt.

Since the entire band-shaped tensioning belt or the tensioning belt is not produced over its entire circumference from an elastic material but there is at least one circumferential region or regions which are not elastic, particularly high tensioning forces can be achieved and fatigue caused by a decreasing elasticity can be reduced. In the context of the present description, the circumferential direction of the band-shaped tensioning belt refers to the direction of looping of the band-shaped tensioning belt around the vehicle rim, on which the tensioning belt is clamped.

If reference is made in the present case to non-elastic sections of the band-shaped tensioning belt, there is no extension of the non-elastic sections during the application of the tensioning belt and clamping of the tensioning belt by the elastic sections, as opposed to an expansion of the elastic sections. A modulus of elasticity of the non-elastic sections is thus greater than that of the elastic sections in such a way that elastic extension and shortening of only the elastic sections or of the at least one elastic section takes place during the intended use of the tensioning belt. The elasticity of the at least one elastic section is thus many times greater than the elasticity of the at least one non-elastic section.

According to this embodiment according to the invention, the receiving device is formed by a pocket made of an elastic material. The tensioning belt is in particular manufactured from a textile material.

The pocket is formed in a particularly integral manner with an elastic section of the endless belt. For example, this section has the form of an elastic hose, in the hose interior of which the measuring sensor can be accommodated, for example by being pushed through an inlet opening of the elastic hose.

According to an alternative embodiment according to the invention, the band-shaped tensioning belt is designed in its entirety as a flexible hose, the hose interior of which forms the receiving device for the measuring sensor. The hose thus extends in the circumferential direction of the vehicle rim or, as previously defined, in the circumferential direction of the tensioning belt. The elastic hose and thus the band-shaped tensioning belt are made of a textile material.

Here, too, it is advantageous if the elastic hose has an inlet opening, in particular viewed in the circumferential direction, on its radially inner or radially outer side, via which the measuring sensor can be inserted into the hose interior.

The inlet opening can be embodied in the elastic hose in such a way that it is closed during tensioning of the hose in the circumferential direction of the tensioning belt by tightening the tensioning belt onto the vehicle rim. This concerns both aforementioned embodiments. The tensioning can cause a closure of the cross-section of the inlet opening, because the hose is drawn lengthwise in this area. For this purpose, the inlet opening advantageously extends with its longitudinal direction in the circumferential direction of the tensioning belt. In addition or alternatively, the inlet opening can be closed by being pressed against the rim surface by the tensioning of the tensioning belt.

It is particularly advantageous if the elastic hose is designed in such a way that the hose interior during the tensioning of the hose in the circumferential direction of the tensioning belt is reduced in its cross-section by tightening the tensioning belt onto the vehicle rim, such that the measuring sensor is braced in the hose or in the hose interior. This clamping of the measuring sensor within the hose avoids slipping of the measuring sensor within the hose interior.

In the embodiment as a hose, the tensioning belt can either be designed as an endless belt, but alternatively also as a belt with two ends which can be connected to one another. In the latter case, a suitable closure is advantageously provided in order to connect the two opposing ends to each other.

According to an embodiment of the invention, the hose interior is divided in the circumferential direction of the tensioning belt into individual sections which are separated from each other. The subdivision can be effected, for example, by sewing the hose transversely to the circumferential direction of the tensioning belt. Other subdivisions can also be considered.

It is advantageous if the hose interior has a separated section which forms the receiving device. In other words, one of the subdivisions forms a pocket, namely a resilient pocket, into which the measuring sensor can be inserted and held there during operation of the vehicle rim. Correspondingly, the inlet opening is also provided in this section.

In general, however, embodiments of the invention can be considered in the above-described configuration as well as in the other configurations described herein in which the measuring sensor is not insertably and/or removably enclosed in the tensioning belt, e.g. sewn into the hose interior or the pocket, or in which the measuring sensor is non-detachably fastened externally on the tensioning belt, in particular by material bonding, such as by gluing or scorching.

According to a further embodiment according to the invention, the band-shaped tensioning belt is designed as a textile endless belt, which is elastic at least in sections in the circumferential direction of the tensioning belt or the direction of wrapping of the vehicle rim.

The endless textile band can, for example, be woven or knitted, that is to say produced by weaving or knitting. However, other manufacturing methods, such as knitting or felting, are also contemplated.

According to one embodiment, the tensioning belt is made over its entire length in the circumferential direction from an elastic textile.

For example, the housing of the measuring sensor is sewn on the tensioning belt directly or via an intermediate element which is detachably or non-detachably connected to the sensor. The sensor housing or the intermediate element can also be connected, in particular, with a first side to a first tensioning belt end and a second side, which in particular is opposite the first side, to a second tensioning belt end, for example by stitching.

If the band-shaped tensioning belt is not designed as an endless belt, but has two free ends which are positioned opposite one another in the circumferential direction, these ends can advantageously be connected to each other via a magnetic closure in order to tension the tensioning belt over the circumference of the vehicle rim. The magnets can rest against one another in the closed state, for example in the radial direction of the rim, i.e. perpendicularly to the longitudinal direction (circumferential direction) of the tensioning belt. The magnets can also engage with one another, in particular by means of mutually coordinated, profiled surfaces, in order to form an undercut. Such a profiled surface reinforces the closure force.

Furthermore, particularly with a profiled surface of the magnets, it is easily and reliably possible to variably adjust the closed tensioning belt length to different vehicle rim diameters, namely if the magnetic closure has different magnetic latching positions to adjust the different lengths.

In particular, if a position for the measuring sensor in the tensioning belt is fixed in the different embodiments in accordance with the invention, for example by a base or a pocket, a compensation weight can be provided, for example, in a radially opposite manner in the assembled state of the tensioning belt in order to reduce or prevent imbalance. The weight can be formed in the case of a tensioning belt with two ends, in particular by the closure.

In the illustrated embodiments according to the invention, the band-shaped tensioning belt advantageously extends over its entire length against a radially outer surface of the vehicle rim, i.e. at least substantially exclusively in the circumferential direction, without regions being provided in which the tensioning belt extends radially away from the vehicle rim.

The invention shall be explained in the following with reference to exemplary embodiments and the drawings, wherein:

FIG. 1 shows an exemplary embodiment of a first design in accordance with the invention;

FIG. 2 shows a second embodiment of the invention with a hose-shaped tensioning belt;

Figure 3:
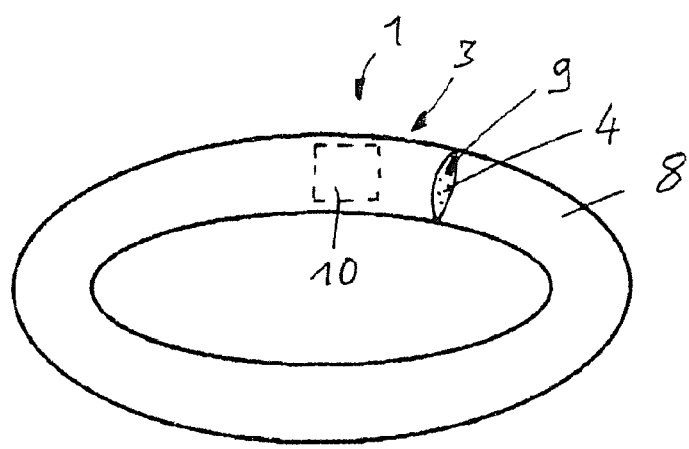
FIG. 3 shows an embodiment of the invention with a hose-shaped tensioning belt, which is designed as an endless hose.

FIG. 1 shows a first embodiment of the invention in which the fastening apparatus has a band-shaped tensioning belt 1, which is designed as an endless belt, having only individual elastic sections 2. The sections of the tensioning belt 1 in the circumferential direction between the elastic sections 2 are made from a non-elastic material however.

The elastic sections 2, the number of which can deviate from the number shown here, namely three, wherein at least one elastic section 2 is provided, allow the tensioning belt 1 to be expanded and pulled over the rim edge onto a vehicle rim 11, so that it is braced against the outer circumference of the rim or of the rim bed as a result of the elasticity. This bracing is symbolized by the thick arrow in FIG. 1, wherein the quadruple arrow symbolizes the widening of the tensioning belt 1 for pulling over the rim edge.

The tensioning belt 1 has a receiving device 3, into which the measuring sensor 10 can be inserted before or after the tensioning belt 1 has been installed on the rim 11, either releasably or non-releasably. The receiving device 3 can, for example, be provided in the form of a base or adapter, as shown in FIG. 1. According to a further embodiment, the receiving device 3 is formed by a pocket of elastic material, for example integrated into one of the elastic sections 2. This is shown schematically by the dotted line in one of the elastic sections 2, wherein the dotted line represents an inlet opening 4, which could also be called an insertion opening, through which the measuring sensor 10 could then be inserted into the corresponding elastic pocket, which is denoted here with reference numeral 5. An embodiment without an inlet opening 4, with a permanently integrated measuring sensor 10 in the elastic pocket 5, is also possible.

In the embodiment of FIG. 2, the tensioning belt 1 is designed as a belt with two ends 6.1, 6.2, which can be connected to one another in order to clamp the tensioning belt 1. The connection is made, for example, via a closure with two closure halves 7.1, 7.2, wherein the first closure half 7.1 is provided at the first end 6.1 and the second closure half 7.2 at the second end 6.2. As is shown schematically in the detail a of FIG. 2, the two closure halves 7.1, 7.2 form, for example, a magnetic closure 7. If, in this case, the closure halves 7.1, 7.2 are formed in a profiled manner so that they engage with one another to form at least one undercut or a plurality of undercuts, tensile forces can be absorbed particularly securely. If the profiling forms several latching positions, as shown in the detail a, a length-adjustable closure for the tensioning belt 1 is further achieved, which still uses the advantage of undercuts.

In the embodiment according to FIG. 2, the tensioning belt 1 is designed as an elastic hose 8 which has a hose interior 9 into which a measuring sensor 10 can be inserted via the inlet opening 4. The hose interior 9 can be divided or separated into individual sections in the longitudinal direction of the hose 8, which corresponds to the circumferential direction of the tensioning belt 1. In the exemplary embodiment shown, for example, a seam 12 is provided in order to achieve a corresponding subdivision, so that an elastic pocket 5 for the measuring sensor 10 is formed within the hose interior 9. Alternatively, a design without an inlet opening 4 is also possible.

In the embodiment according to FIG. 3, the band-shaped tensioning belt 1 is again designed as an elastic hose 8, in the hose interior 9 of which the measuring sensor 10 can be accommodated. Here too, the measuring sensor 10 is introduced into the hose interior 9 again via an inlet opening 4, or the measuring sensor 10 is non-removably accommodated in the hose interior 9 so that the inlet opening 4 can be dispensed with.

In the design of FIG. 3, the tensioning belt 1 is designed as an endless belt and at the same time the elastic hose 8 is designed as an endless hose, i.e. this time it does not have any subdivision or separation of the hose interior 9. Alternatively, in the case of an endless belt, at least one corresponding partition could also be provided in order to subdivide the hose interior 9 into individual sections, wherein the individual sections are separated from each other. Here too, the inlet opening 4 can be permanently closed or can be dispensed with, depending on the manufacturing method of the hose 8, if the measuring sensor 10 should accommodated in a non-removable manner in the hose interior 9.

Figure 4:
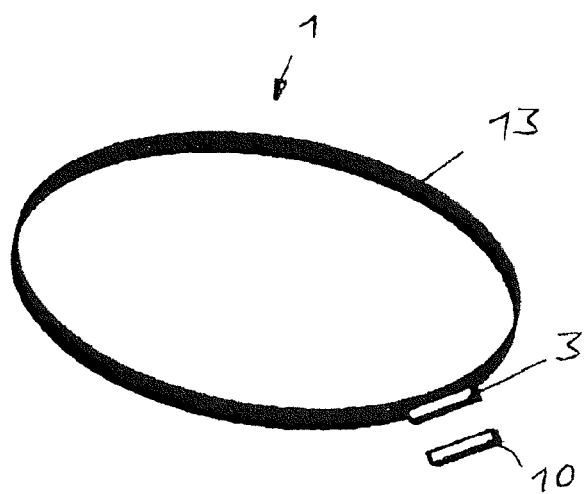
FIG. 4 shows a further design of the invention with a textile endless belt.

In the embodiment according to FIG. 4, the band-shaped tensioning belt 1 is designed as a textile endless belt 13, which in the circumferential direction of the tensioning belt 1 is elastic at least in sections (see FIG. 1) or over the entire circumference. The endless textile belt 13 is produced, for example, by weaving or knitting.

Once again, a receiving device 3 is provided for the measuring sensor 10, which can be designed, for example, in the form of a pocket, but alternatively also in the form of a base. Reference is made in this regard to the embodiments according to FIGS. 1 to 3 and in particular to the description there of the receiving devices 3 or elastic pockets 5.

LIST OF REFERENCE NUMERALS

1 Tensioning belt
2 Elastic section

3 Receiving device
4 Inlet opening
5 Elastic pocket
6.1, 6.2 Ends
7 Magnetic closure
7.1, 7.2 Closure halves
8 Elastic hose
9 Hose interior
10 Measuring sensor
11 Vehicle rim
12 Seam
13 Textile endless belt

The invention claimed is:

1. A fastening apparatus for fastening a measuring sensor operable to measure a tire operational parameter within a tire cavity on a vehicle rim,
   having a band-shaped tensioning belt which has a receiver for the measuring sensor, the band-shaped tensioning belt sized to extend about the vehicle rim; wherein
   the band-shaped tensioning belt comprises an elastic material;
   wherein
   the band-shaped tensioning belt comprises an elastic hose made of a textile material, a hose interior of which forms the receiver for the measuring sensor, whereby the band-shaped tensioning belt is operable to position the measuring sensor to measure the tire operational parameter when the band-shaped tensioning belt extends about the vehicle rim.

2. A fastening apparatus according to claim 1, wherein the elastic hose has an inlet opening wherein the measuring sensor can be inserted into the hose interior via the inlet opening.

3. A fastening apparatus according to claim 2, wherein the inlet opening is formed in the elastic hose in such a way that it is closed during tensioning the hose in the circumferential direction of the tensioning belt by tightening the tensioning belt onto the vehicle rim.

4. A fastening apparatus according to claim 3, wherein the elastic hose is designed in such a way that the hose interior, when the hose is tensioned in the circumferential direction of the tensioning belt, is reduced in its cross-section by tightening the tightening belt onto the vehicle rim in order to brace the measuring sensor within the hose.

5. A fastening apparatus according to claim 3, wherein the tensioning belt is designed as an endless belt.

6. A fastening apparatus according to claim 3, wherein the tensioning belt has two free ends which can be connected to one another by way of a magnetic closure.

7. A fastening apparatus according to claim 2, wherein the elastic hose is designed in such a way that the hose interior, when the hose is tensioned in the circumferential direction of the tensioning belt, is reduced in its cross-section by tightening the tightening belt onto the vehicle rim in order to brace the measuring sensor within the hose.

8. A fastening apparatus according to claim 2, wherein the tensioning belt is designed as an endless belt.

9. A fastening apparatus according to claim 2, wherein the tensioning belt has two free ends which can be connected to one another by way of a magnetic closure.

10. A fastening apparatus according to claim 1, wherein the elastic hose is designed in such a way that the hose interior, when the hose is tensioned in the circumferential direction of the tensioning belt, is reduced in its cross-section by tightening the tightening belt onto the vehicle rim in order to brace the measuring sensor within the hose.

11. A fastening apparatus according to claim 10, wherein the tensioning belt is designed as an endless belt.

12. A fastening apparatus according to claim 1, wherein the tensioning belt is designed as an endless belt.

13. A fastening apparatus according to claim 1, wherein the tensioning belt has two free ends which can be connected to one another by way of a magnetic closure.

14. A fastening apparatus according claim 1, wherein the hose interior is subdivided in the circumferential direction of the tensioning belt into mutually separate sections.

15. A fastening apparatus according to claim 14, wherein the hose interior has a separated section which forms the receiver.

16. The fastening apparatus of claim 1, wherein the measuring sensor comprises an air pressure sensor.

17. A fastening apparatus for fastening a measuring sensor within a tire cavity on a vehicle rim,
    having a band-shaped tensioning belt which has a receiver for the measuring sensor; wherein
    the band-shaped tensioning belt comprises an elastic material;
    wherein
    the band-shaped tensioning belt is designed as a textile endless belt which is at least partially elastic in the circumferential direction of the tensioning belt, the band-shaped tensioning belt being sufficiently elastic to be expanded and pulled over a rim edge of the vehicle rim and onto the vehicle rim so that it is braced against and in contact with an outer circumference of the vehicle rim.

18. A fastening apparatus according to claim 17, wherein the endless textile belt is woven or knitted.

19. A fastening apparatus according to claim 17, wherein the tensioning belt is made over its entire length in the circumferential direction from an elastic textile.

20. The fastening apparatus of claim 17, wherein the measuring sensor comprises an air pressure sensor.

21. A sensor apparatus, comprising:
    a band-shaped tensioning belt, the band-shaped tensioning belt comprising an elastic hose made of a textile material having a hose interior, the band-shaped tensioning belt sized to be positioned over and engage a vehicle rim; and
    a tire parameter measuring sensor operable to measure a tire operational parameter, the measuring sensor positioned in the hose interior, the band-shaped tensioning belt sized and shaped to secure the measuring sensor within a tire cavity on a vehicle rim.

22. A vehicle wheel, comprising:
    a vehicle rim sized and shaped to operably receive a tire to define a tire cavity between the rim and the tire;
    a tire parameter measuring sensor positioned in the tire cavity between the rim and the tire; and
    a band-shaped tensioning belt, the band-shaped tensioning belt comprising an elastic material, the band-shaped tensioning belt extending about the vehicle rim in the tire cavity, the band-shaped tensioning belt comprising a hose having a hose interior forming a receiver, the tire parameter measuring sensor operably positioned in the receiver to measure a tire operational parameter.

23. The vehicle wheel of claim 22, wherein the band-shaped tensioning belt is sufficiently elastic to be expanded and pulled over a rim edge of the vehicle rim and onto the vehicle rim so that it is braced against and in contact with an outer circumference of the vehicle rim.

24. The vehicle wheel of claim 22, wherein the tire parameter measuring sensor comprises an air pressure sensor.

\* \* \* \* \*